United States Patent [19]

Ito

[11] Patent Number: 5,103,320
[45] Date of Patent: Apr. 7, 1992

[54] IMAGE READING APPARATUS WITH CORRECTION OF TWO-DIMENSIONAL SHADING

[75] Inventor: Masaaki Ito, Yokohama, Japan

[73] Assignee: Ricoh Company, Ltd., Tokyo, Japan

[21] Appl. No.: 713,282

[22] Filed: Jun. 11, 1991

[30] Foreign Application Priority Data

Jun. 11, 1990 [JP] Japan .................................. 2-149806

[51] Int. Cl.$^5$ ............................................. H04N 1/00
[52] U.S. Cl. .................................. 358/461; 355/228; 355/233; 355/327; 358/474; 358/487
[58] Field of Search ............... 355/210, 233, 228, 229, 355/230, 232, 203, 204, 202, 200, 214, 326, 327; 358/405, 406, 461, 474, 487, 300, 905

[56] References Cited

U.S. PATENT DOCUMENTS

| | | | |
|---|---|---|---|
| 4,027,962 | 6/1977 | Mailloux | 355/327 X |
| 4,043,656 | 8/1977 | Cherian | 355/327 X |
| 4,063,810 | 12/1977 | Mailloux | 355/327 |
| 4,111,540 | 9/1978 | Bollman | 355/232 X |
| 4,120,580 | 10/1978 | Mailloux et al. | 355/327 |
| 4,216,495 | 8/1980 | Neilson et al. | 358/474 X |
| 4,520,395 | 5/1985 | Abe | 358/461 X |
| 4,760,464 | 7/1988 | Sakano | 358/461 |
| 4,831,458 | 5/1989 | Watanabe | 358/474 X |

*Primary Examiner*—A. T. Grimley
*Assistant Examiner*—Sandra L. Brasé
*Attorney, Agent, or Firm*—Oblon, Spivak, McClelland, Maier & Neustadt

[57] ABSTRACT

An image reading apparatus reads an optical image which is projected onto a predetermined plane by a slide projector. The image reading apparatus includes a scanner for optically scanning the optical image formed by the slide projector and for generating image information, a filter for eliminating a high frequency component of the image information and for outputting a low frequency component of the image information, a memory for sampling the low frequency component of the image information corresponding to each predetermined number of pixels when a predetermined reference optical image is formed by the slide projector, and for storing the sampled low frequency component of the image information as reference data, and a correcting circuit for correcting the two dimensional shading including the image information supplied from the scanner means for every pixel based on the reference data stored in the memory so that the low frequency component is deleted from the image information.

6 Claims, 5 Drawing Sheets

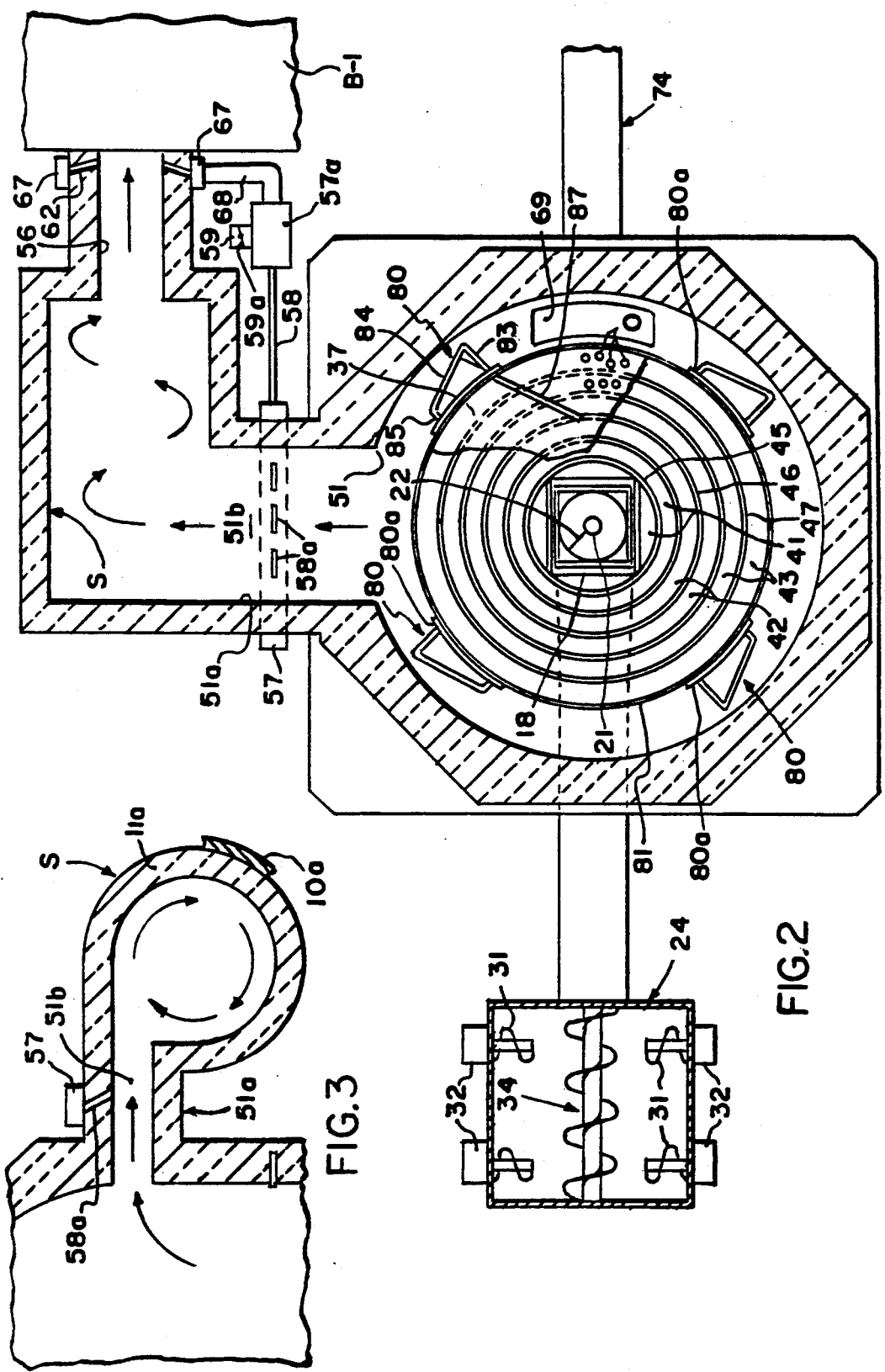

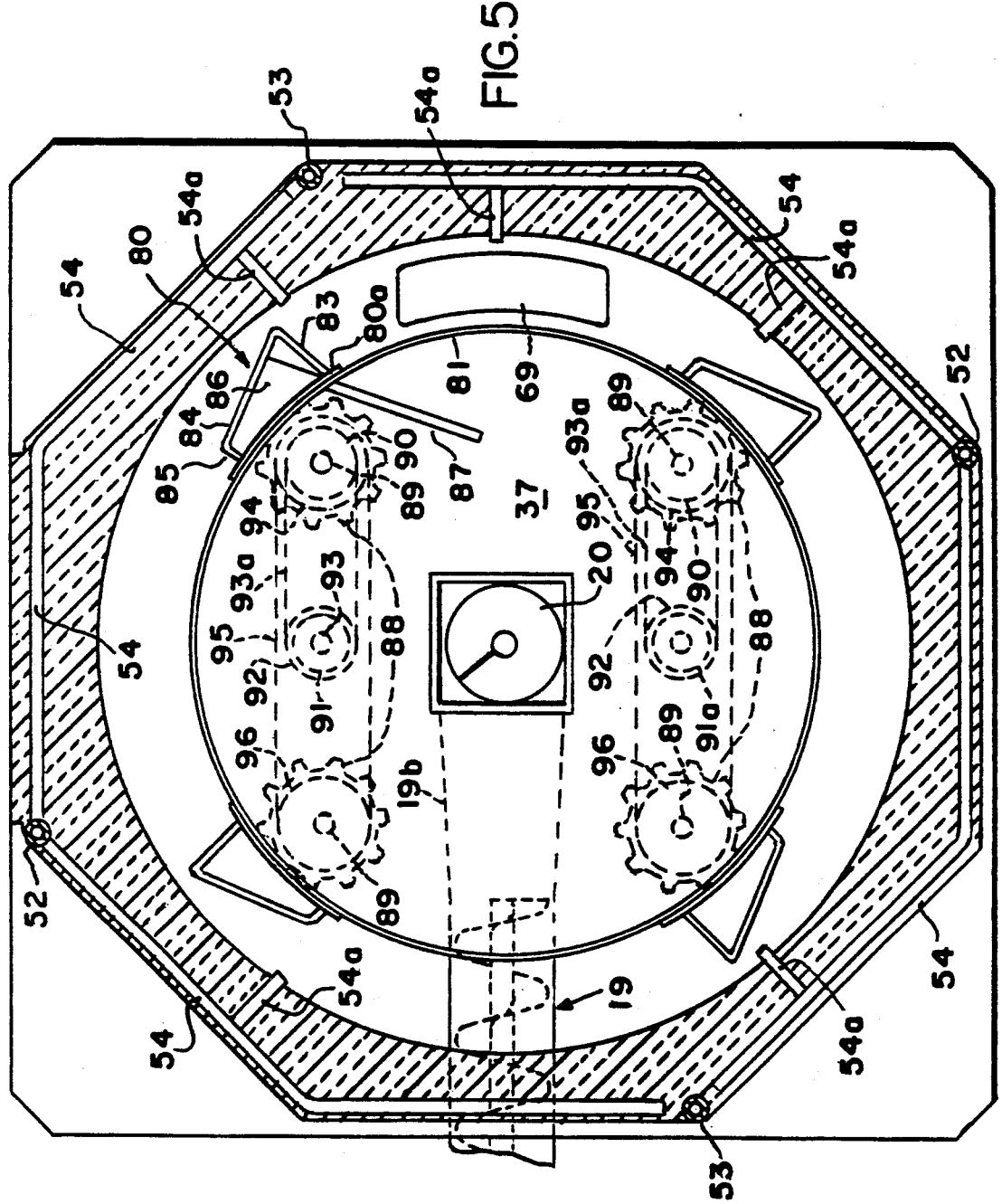

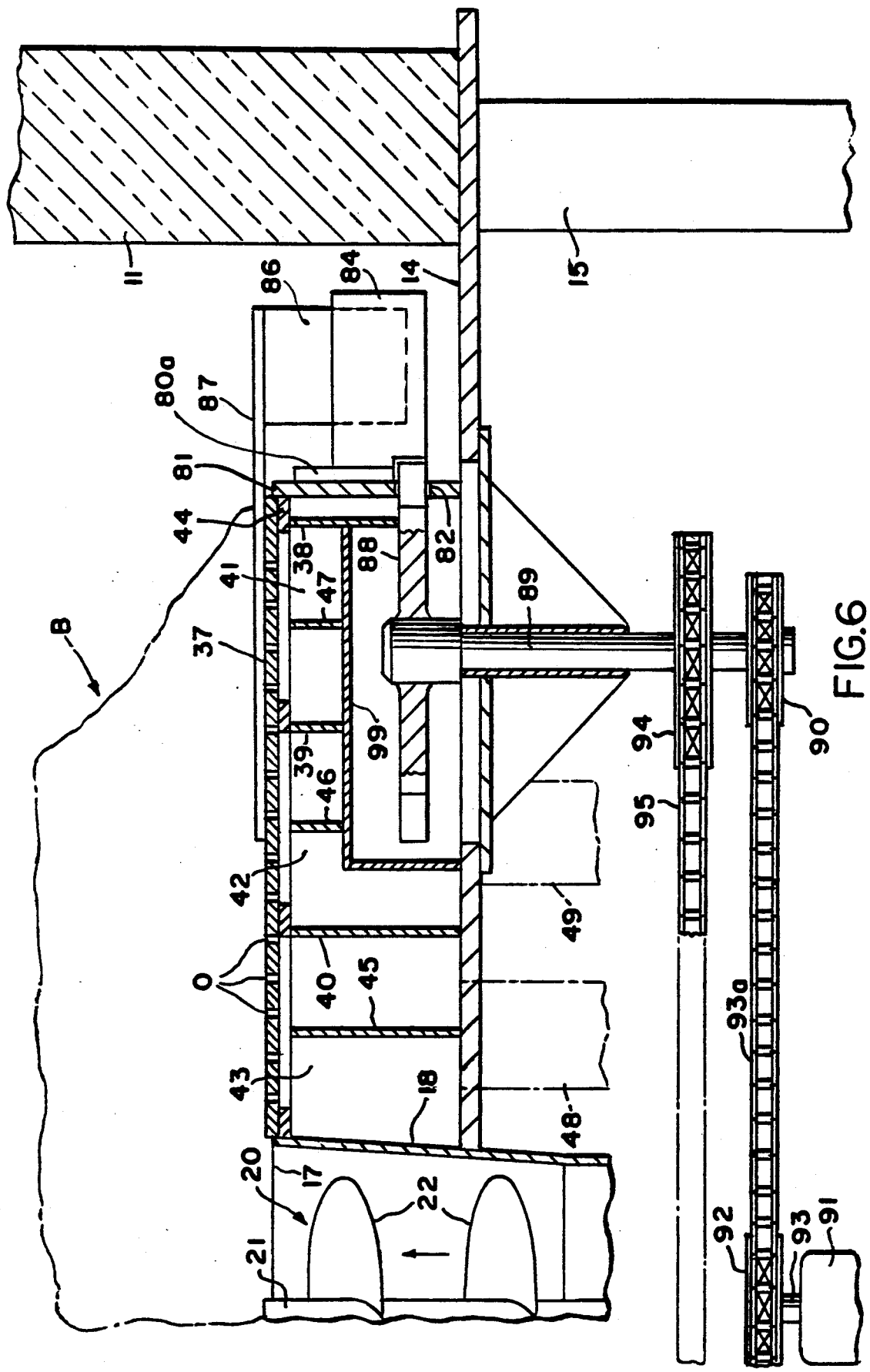

IMAGE READING APPARATUS WITH CORRECTION OF TWO-DIMENSIONAL SHADING

BACKGROUND OF THE INVENTION

The present invention generally relates to an image reading apparatus, and more particularly to an image reading apparatus used in a digital copy machine having a function for copying an image formed by a slide projector.

In a copy machine in which an electrophotography process is carried out, a document is optically read, and then a photosensitive drum is exposed so that a latent image corresponding to image information obtained by reading the document is formed on the photosensitive drum. Then the latent image is developed by toner so that a toner image corresponding to the latent image is formed on the photosensitive drum. The toner image is then transferred to a recording sheet, so that a visible image corresponding to an image on the document is formed on the recording sheet. That is, the document is copied by the copy machine.

A copy machine in which an image formed by a slide projector can be copied has been proposed. In this type of copy machine, due to the shape of a light source of the slide projector, the optical property of a projector lens, the cosine-4th power rule and so on, two dimensional illuminance distribution on a plane onto which an image is projected by the slide projector is uneven. Thus, a two dimensional shading is generated on the image which is obtained by the copying of an image formed by the slide projector. Conventionally, to eliminate the two dimensional shading, the unevenness of the two dimensional illuminance distribution is corrected by use of an optical system including a lens and the like.

In addition, illuminance on a surface of the document, which is illuminated via an optical system by a light source of a scanner, varies in a main scanning direction. Thus, in this case, even if the density of the document is constant, image data output from the scanner varies in the main scanning direction. This type of variation of the image data in the main scanning direction is corrected based on a white reference. The white reference is obtained when the scanner scans a white reference plate having a predetermined density. The above correction of the variation of the image data in the main scanning direction is generally referred to as a shading correction.

However, it is difficult for the optical system to entirely correct the unevenness of the two dimensional illuminance distribution described above. Thus, the amount of light on a periphery of an image formed by the slide projector is insufficient, so that a periphery of a copied image formed on the recording sheet is dark. As the optical system has to be used for correcting the unevenness of the two dimensional illuminance distribution, the size of the copy machine and the cost thereof increase.

In addition, if correction data for each pixel with respect to a two dimensional shading based on the two dimensional illuminance distribution is stored in a memory, it is required that the memory have a large capacity.

SUMMARY OF THE INVENTION

Accordingly, a general object of the present invention is to provide a novel and useful image reading apparatus in which the disadvantages of the aforementioned prior art are eliminated.

A more specific object of the present invention is to provide an image reading apparatus in which the image data can easily be corrected so that the two dimensional shading based on the unevenness of the two dimensional illuminance distribution is cancelled.

Another object of the present invention is to provide an image reading apparatus in which a capacity of a memory which stores correcting data used for canceling the two dimensional shading can be small.

The above objects of the present invention are achieved by an image reading apparatus for reading an optical image which is projected onto a predetermined plane by a slide projector, the image reading apparatus comprising: a) scanning means for optically scanning the optical image projected onto the plane and for generating image information corresponding to the optical image projected by the slide projector; b) first reference data storage means, coupled to the scanning means, for storing first reference data used for correcting a two dimensional shading which is generated in the image information based on an optical system of the slide projector, the first reference data storage means comprising: 1) filter means, coupled to the scanning means, for eliminating a high frequency component of the image information and for outputting a low frequency component of the image information; and 2) storage means, coupled to the filter means, for sampling the low frequency component of the image information corresponding to each predetermined number of pixels when a predetermined reference optical image is projected onto the plane by the slide projector, and for storing the sampled low frequency component of the image information as the first reference data; and c) first correcting means, coupled to the scanning means and the first reference data storage means, for correcting the two dimensional shading including the image information supplied from the scanning means for every pixel based on the first reference data stored in the storage means so that the low frequency component is deleted from the image information.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
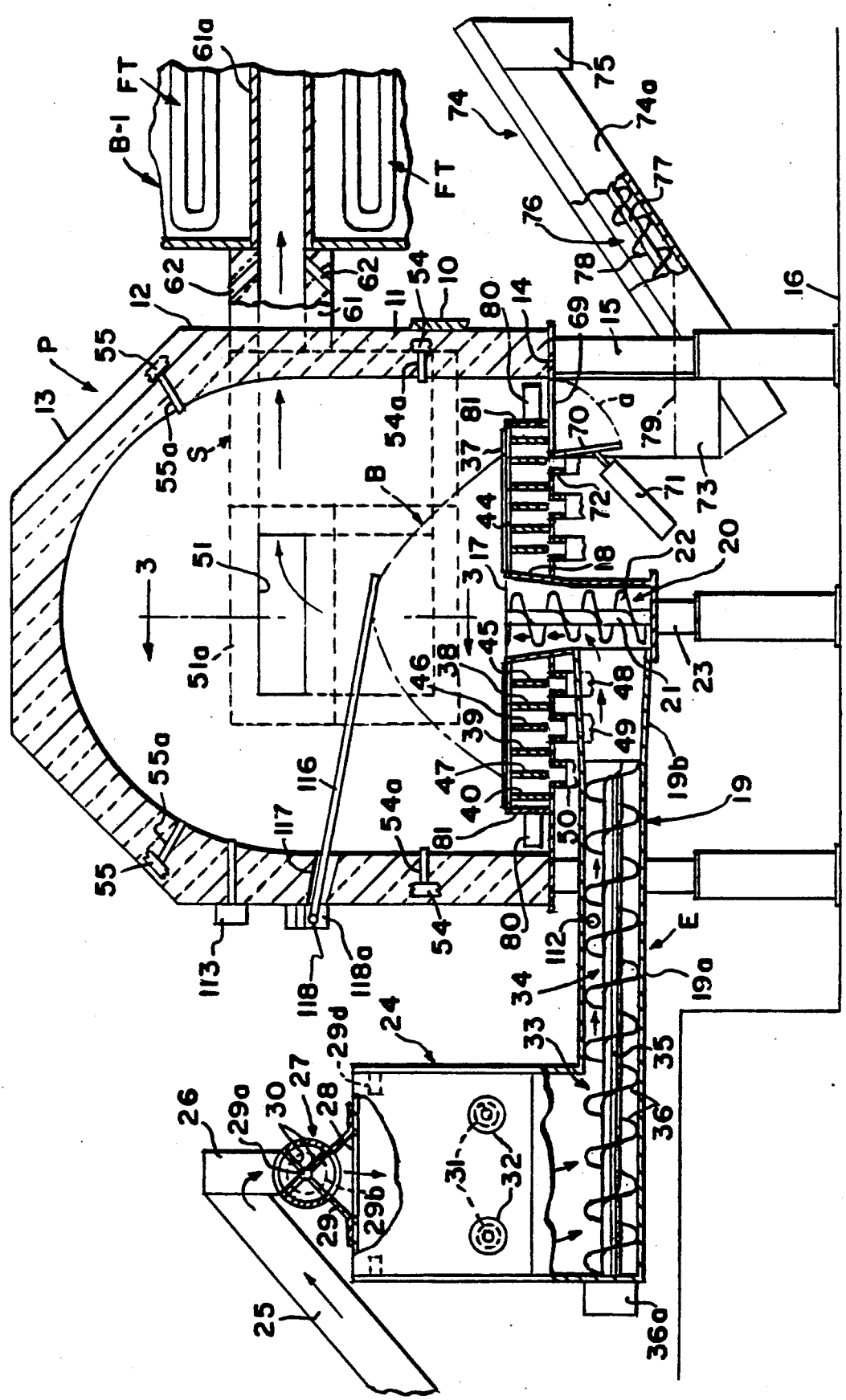
FIG. 1 is a diagram illustrating a structure of an optical scanning system in an image reading apparatus according to an embodiment of the present invention, in a case where the image reading apparatus reads an image formed on a document.

FIG. 1 shows an optical scanning system which reads an image formed on a document. This optical scanning system is provided for a digital copy machine. Referring to FIG. 1, a document 9 is set on a contact glass 10 which is mounted on an upper part of the copy machine. A fluorescent lamp 11 is provided under the contact glass 10 so as to be capable of moving backward and forward. A white reference plate 12 is mounted at an end of the contact glass 10. A surface of the white reference has a predetermined density.

A first mirror 13, a second mirror 14, a third mirror 15, a lens 16 and a CCD sensor 1 are respectively provided under the fluorescent lamp 11. The first mirror 13 can move backward and forward in a sub scanning direction with the fluorescent lamp 11. A light reflected by a surface of the document 9 is incident to the first mirror 13 and reflected thereby in a horizontal direction. The second mirror 14 and the third mirror 15 can move backward and forward together in a horizontal direction. The light from the first mirror 13 is reflected by the second mirror 14 and the third mirror 15, and then the light from the third mirror 15 passes through the lens 16. Then the light passing through the lens 16 is focused on the surface of the CCD sensor 1. In a case where the above scanning system scans the document 9, the fluorescent lamp 11 and the first mirror 13 move at a speed V in a direction indicated by an arrow in FIG. 1, and the second and third mirrors 14 and 15 move at a speed ½ V in the same direction.

Figure 2:
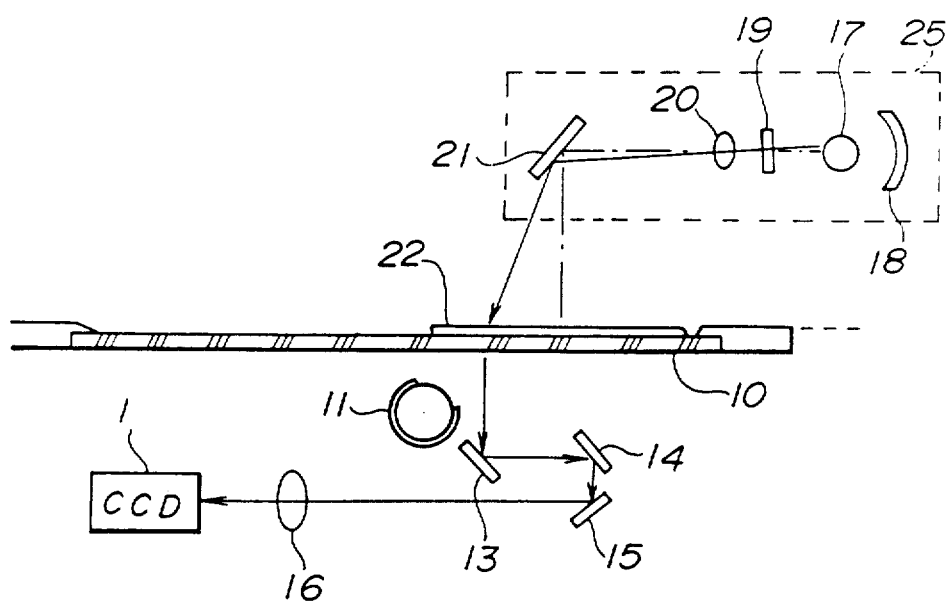
FIG. 2 is a diagram illustrating a structure of the optical scanning system in a case where the image reading apparatus reads an image formed by a slide projector.

FIG. 2 shows the structure of the optical scanning system in a case where an image formed by a slide projector is read. In FIG. 2, those parts which are the same as those shown in FIG. 1 are given the same reference numbers.

Referring to FIG. 2, a slide projector 25 is arranged over the contact glass 10. The slide projector 25 has a light source 17, a reflector 18, a slide film 19, a project lens 20 and a mirror 21. The reflector 18 reflects a light from the light source 17 in a predetermined direction so that an optical path is formed in a horizontal direction. The slide film 19, the projector lens 20 and the mirror 21 are respectively arranged on the optical path in this order, so that the light from the light source 17 passes through the slide film 19 and the project lens 20 and is incident to the mirror 21. A Fresnel lens 22 is mounted on the contact glass 10. The light from the slide projector 25 is incident on the Fresnel lens 22.

The fluorescent lamp 11, the first, second and third mirrors 13, 14 and 15, the lens 16 and the CCD sensor 1 are respectively arranged under the contact glass 10 in the same manner as shown in FIG. 1.

In a case where an image formed by the slide projector 25 is copied, the fluorescent lamp 11 is turned off and the light source 17 of the slide projector 25 is turned on. The light from the light source 17 passes through the slide film 19 and the project lens 20, so that an optical image corresponding to an image pattern of the slide film 19 is enlarged. Then, the light from the project lens 20 is reflected by the mirror 21 and is incident on the Fresnel lens 22, so that the enlarged optical image is projected onto the surface of the contact glass 10. The light slantingly incident on the Fresnel lens 22 and passing through the Fresnel lens 22 travels in a direction perpendicular to the surface of the contact glass 10. Then the light from the contact glass 10 travels via the first, second and third mirror 13, 14 and 15 and lens 16, so that the optical image is focused on the surface of the CCD sensor 1.

In the image reading apparatus having the above structure, the following three types of shadings are generated.

(a) A two dimensional shading is generated based on the optical system of the slide projector 25.

Figure 3A:
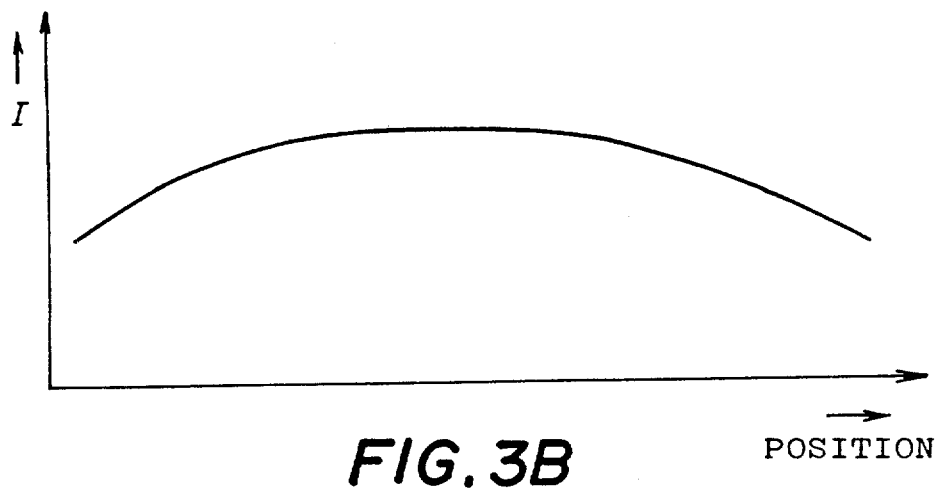
FIG. 3A is a diagram illustrating an illuminance distribution on a plane onto which an image is projected by the slide projector.

The center of the light source 17 of the slide projector 25 is bright, so that a two dimensional illuminance distribution on a plane onto which an optical image is projected by the slide projector 25 has a shape as shown in FIG. 3A. That is, the periphery of the optical image is dark.

(b) A first one dimensional shading is generated based on the optical system of the scanner.

An illuminance distribution on the surface of the document which is scanned by the scanner is uneven in the main scanning direction.

(c) A second one dimensional shading is generated based on the CCD sensor 1 which converts light energy into electrical energy.

Sensitivities of respective photoelectric conversion elements of the CCD sensor 1 differ from each other, so that a signal output from the CCD sensor 1 is uneven in the main scanning direction.

Figure 3B:
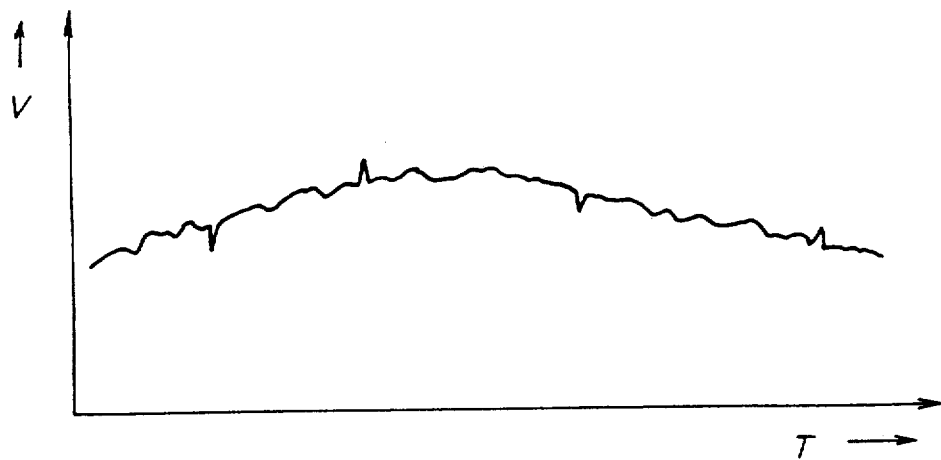
FIG. 3B is a wave shape diagram illustrating an example of a signal output from a CCD sensor in a case where an image formed by the slide projector is supplied to the CCD sensor.

In a case where an optical image formed by the slide projector 25 is copied, the above two dimensional shading (a) and the second one dimensional shading (c) are combined. Thus, in this case, a signal output from the CCD sensor 1 has, for example, a shape as shown in FIG. 3B. In FIG. 3B, as the second one dimensional shading (c) is generated based on the differences between the sensitivities of the photoelectric conversion elements, the second one dimensional shading (c) corresponds to a high frequency component of the signal output from the CCD sensor 1. On the other hand, the two dimensional shading (a) corresponds to a low frequency component of the above signal.

Figure 4:
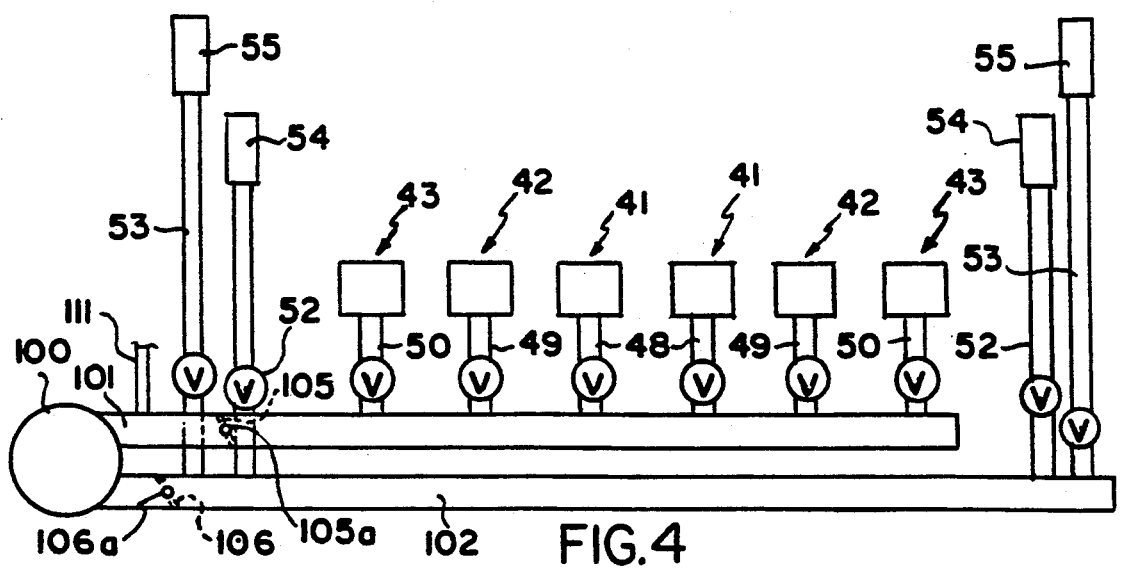
FIG. 4 is a wave shape diagram illustrating an example of a signal output from the CCD sensor in a case where the CCD sensor scans a white reference plate.

In a case where an image formed on the document is copied, the above first and second one dimensional shadings (b) and (c) are combined. Thus, in this case, when the CCD sensor 1 reads the white reference plate 12, a signal output from the CCD sensor 1 has, for example, a shape as shown in FIG. 4.

Figure 5:
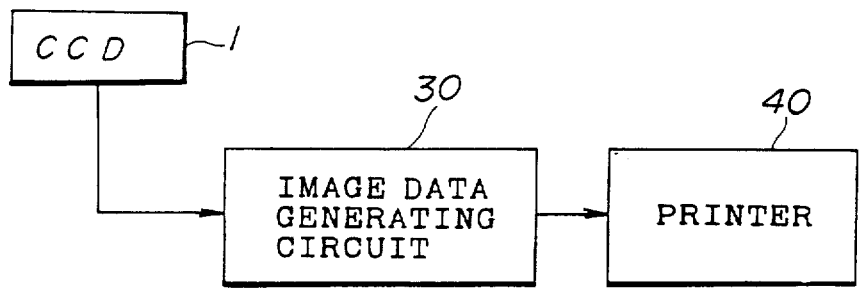
FIG. 5 is a block diagram illustrating a basic structure of an example of a processing system in which the image reading apparatus is used.
Figure 7:
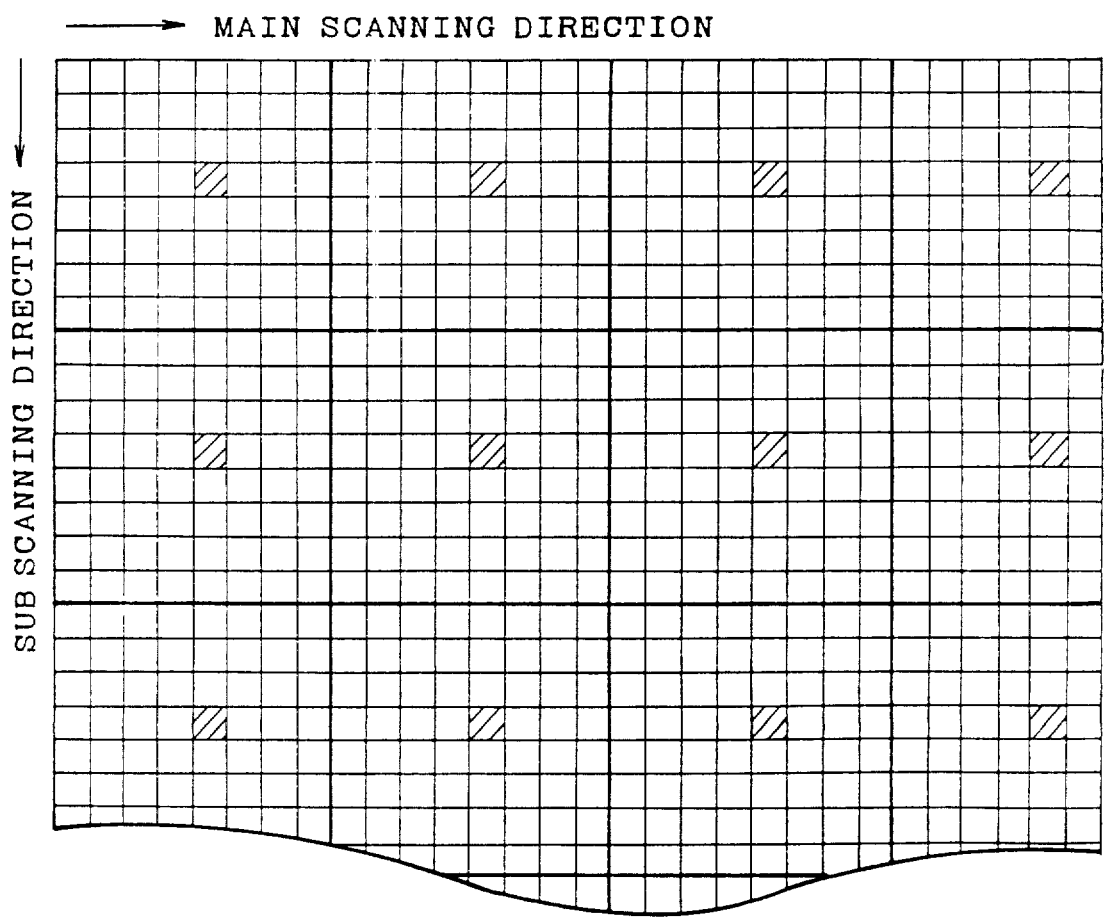

A processing system for processing a signal output from the CCD sensor 1 has a basic structure shown in FIG. 5.

Referring to FIG. 5, the signal output from the CCD sensor 1 is supplied to an image data generating circuit 30. The image data generating circuit 30 corrects the above shadings and generates the image data corresponding to the signal from the CCD sensor 1. The image data output from the image data generating circuit 30 is supplied to a printer 40. The printer 40 prints an image based on the image data from the image data generating circuit 30 in accordance with the electrophotography process.

A detailed description will now be given of the image data generating circuit 30 with reference to FIG. 6.

Figure 6:
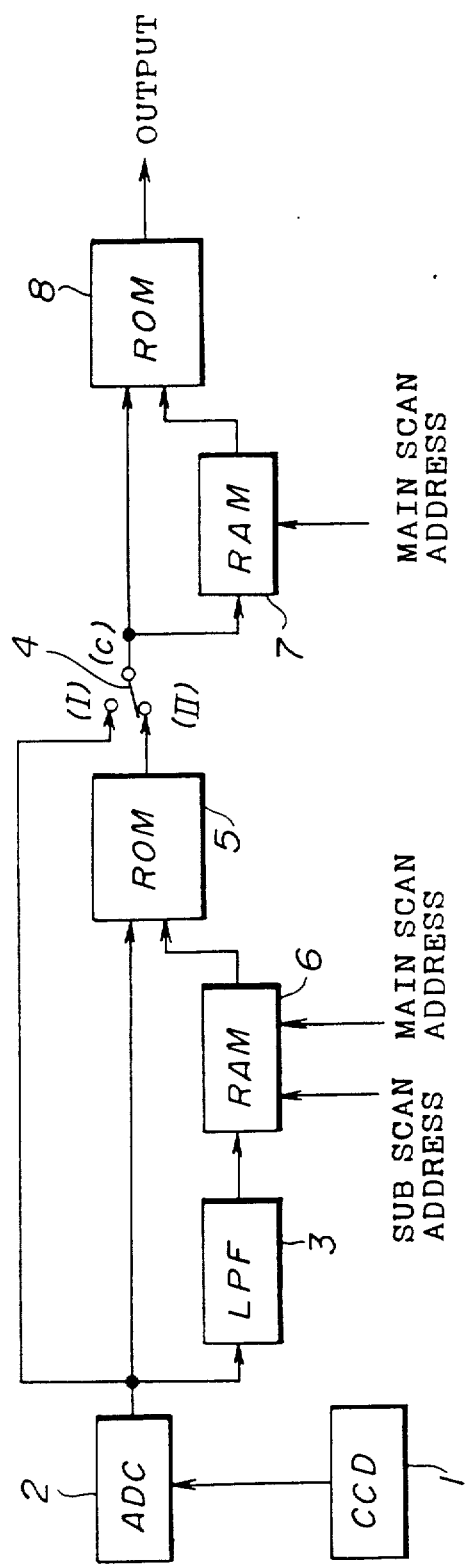
FIG. 6 is a block diagram illustrating a structure of an image data generating circuit shown in FIG. 5.

Referring to FIG. 6, the CCD sensor 1 is connected to an analog-digital converter 2. The analog-digital converter 2 is connected to a low pass filter 3, a first terminal (I) of a switch 4, and a read only memory (ROM) 5. The low pass filter 3 is formed of a digital filter having a predetermined property. The low pass filter 3 is connected to a random access memory (RAM) 6, so that the image data corresponding to the low frequency component of the signal output from the CCD sensor 1 is stored in the RAM 6 at a predetermined timing.

The low pass filter 3 smooths the data output from the analog-digital converter 2. The data output from the low pass filter 3 is stored at an address specified by coordinates in the main scanning direction and in the sub scanning direction in the RAM 6. Then the data read out from the RAM 6 is supplied to the ROM 5 along with the data output from the analog-digital converter 3. First corrected image data has been stored in the ROM 5 beforehand, and the ROM 5 is accessed by an address formed of the data read out from the RAM 6 and output from the analog-digital converter 2.

The ROM 5 is connected to a terminal (II) of the switch 4. The switch 4 selects either the terminal (I) or (II). A common terminal (C) of the switch 4 is connected to a RAM 7 and a ROM 8. The RAM 7 is accessed by an address corresponding to each coordinate point in the main scanning direction. The RAM 7 is connected to the ROM 8 in which second corrected image data is stored. The ROM 8 is accessed by an address formed of the data read out from the RAM 7 and ROM 5.

The shadings are deleted from the image data in accordance with the following process.

First, the switch 4 selects the second terminal (II). Then, the slide projector 25 projects the light onto the Fresnel lens 22 under either a condition in which the slide film 19 is not mounted in the slide projector 25 or a condition in which the slide film 19 having no image pattern is mounted therein. The scanning system as shown in FIG. 2 is operated in a condition in which the fluorescent lamp 11 is turned off. In this case, the low pass filter 3 carries out a smoothing process with respect to the data output from the analog-digital converter 2, so that the data output from the low pass filter 3 includes only a low frequency component corresponding to the unevenness of the illuminance distribution based on the optical system of the slide projector 25.

Figure 7:
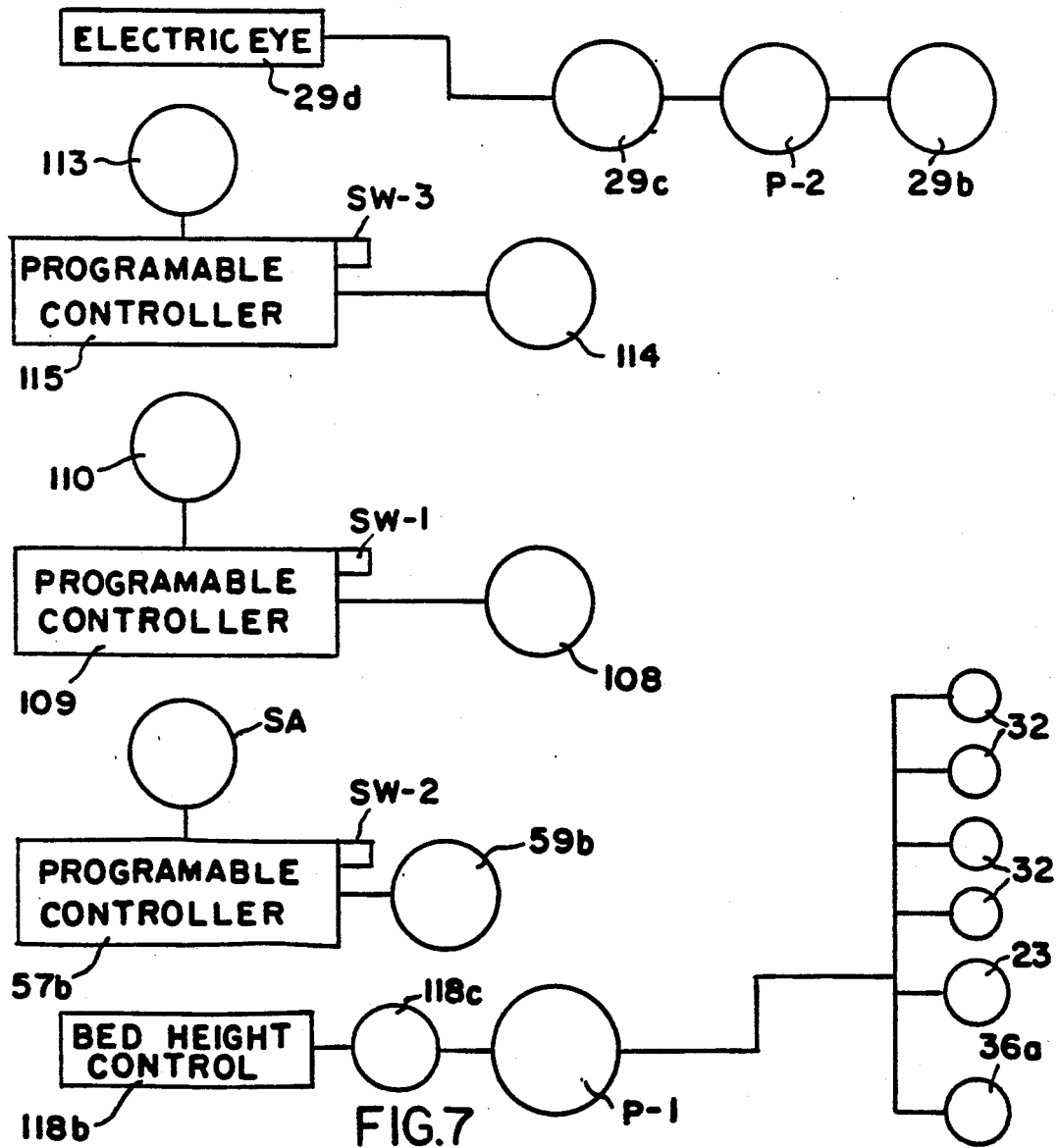
FIG. 7 is a diagram illustrating pixels at which data regarding a shading is sampled.
Figure 1:
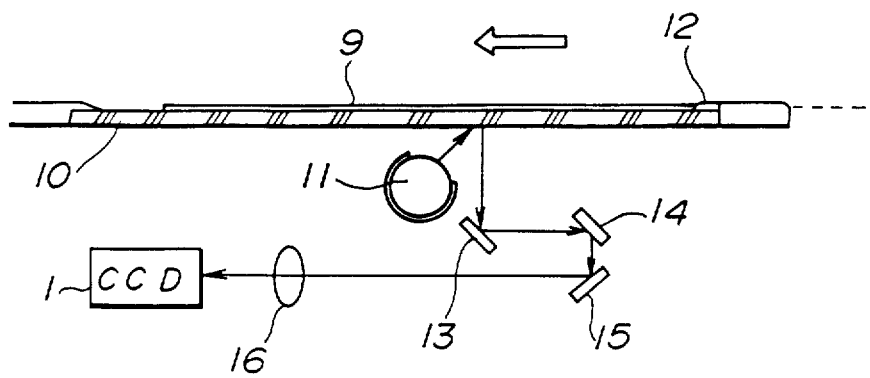

The data output from the low pass filter 3 is sampled for one pixel of each predetermined number of pixels in the main scanning direction and in the sub scanning direction. The sampled data is, as first reference data, stored in the RAM 6. That is, the data on one pixel in each matrix (for example, $8 \times 8$) as shown in FIG. 7 is, as the first reference data, sampled and stored in the RAM 6. Thus information regarding the unevenness of the two dimensional illuminance distribution on a plane onto which an optical image is projected by the slide projector 25 is stored in the RAM 6. In FIG. 7, a pixel in each matrix indicated by slanting lines is that for which the data is sampled.

When the data on one pixel in each matrix is stored in the RAM 6 as has been described above, a capacity of the RAM 6 can be $N_0/N$, where $N_0$ is the number of pixels in all of the area on which an optical image is formed, and N is the number of pixels in each matrix. The capacity of the RAM 6 in a case involving a $8 \times 8$ matrix is 1/64 as large as that in a case where the data on every pixel is stored in the RAM 6.

Next, the scanning system is operated again under a condition that the fluorescent lamp 11 is turned off. While the scanning system is being operated, the RAM 6 is accessed by an address corresponding to a pixel which the scanning system scans. The pixel which the scanning system scans is specified by coordinates in the main scanning direction and in the sub scanning direction. The first reference data on each pixel is read out from the RAM 6 and supplied to the ROM 5. The analog-digital converter 2 supplies the data on each corresponding pixel to the ROM 5. Then, the ROM 5 is accessed by an address formed of the first reference data supplied from the RAM 6 and the data supplied from the analog-digital converter 2. The ROM 5 outputs the first corrected data on each pixel. The first corrected data represents a density corresponding to the data supplied from the analog-digital converter 2 in a case where the first reference data represents a white density having a predetermined value. That is, the data corresponding to the signal output from the CCD sensor 1 is converted to the first corrected data based on the first reference data. The first corrected data does not include the low frequency component corresponding to the unevenness of the two dimensional illuminance distribution. That is, the shading (a) described above is corrected.

The first corrected data on each pixel in a predetermined scan line is supplied via the switch 4 to the RAM 7 and, as a second reference data, stored therein. The second reference data on each pixel which is stored in the RAM 7 includes a high frequency component corresponding to the shading (c) described above.

After the first reference data on each pixel is stored in the RAM 6 and the second reference data on each pixel is stored in the RAM 7 as has been described above, the optical image which is projected onto the surface of the contact glass 10 is copied.

An optical image corresponding to an image pattern formed on the slide film 19 is projected onto the surface of the contact glass 10, and then the scanning system as shown in FIG. 2 is operated. While the scanning system is being operated, the data into which the signal from the CCD sensor 1 is converted by the analog-digital converter 2 is respectively supplied to the ROM 5. Then the first corrected data on each pixel is output from the ROM 5, as has been described above. Further, the first corrected data from the ROM 5 is supplied via the switch 4 to the ROM 8. At this time, the second reference data is read out from the RAM 7 in accordance with the order of the pixels arranged in the main scanning direction. Then, the ROM 8 is accessed by an address formed of the second reference data supplied from the RAM 7 and the first corrected data supplied from the ROM 5. The ROM 8 outputs the second corrected data on each pixel. The second corrected data represents a density corresponding to the first corrected data in a case where the second reference data represents a white density having a predetermined value. That is, the first corrected data is converted to the second corrected data based on the second reference data. The second corrected data does not include both the low frequency component corresponding to the unevenness of the two dimensional illuminance distribution and the high frequency component corresponding to the differenced between the sensitivities of the photoelectric converting elements in the CCD sensor 1. That is, the two dimensional shading (a) and the second one dimensional shading (c) are corrected.

A description will now be given of the operation of the system in a case where an image formed on the document 9 is read.

First, the switch 4 selects the terminal (I). Then the scanning system shown in FIG. 2 is operated. When the scanning system scans the white reference plate 12, the data on the pixels in a line are supplied from the analog-digital converter 2 via the switch 4 to the RAM 7 and stored therein. The data stored in the RAM 7 is used as white reference data.

The scanning system scans the document 9 after the white reference plate 12 is scanned. While the scanning system is scanning the document, the data output from the analog-digital converter 2 is supplied via the switch 4 to the ROM 8. At this time, the white reference data is read out from the RAM 7 in accordance with the order of pixels arranged in the main scanning direction. Then, the ROM 8 is accessed by an address formed of the data from the analog-digital converter 2 and the white reference data supplied from the RAM 7. The ROM 8 outputs the second corrected data on each pixel. In this case, the second corrected data represents a density corresponding to the data from the analog-digital converter 2 in a case where the white reference data represents a white density having a predetermined value. That is, the data from the analog-digital converter 2 is converted into the second corrected data based on the white reference data. The second corrected data does not include the high frequency component corresponding to the differences between the sensitivities of the photoelectric converting elements in the CCD sensor 1 and the low frequency component based on the optical system of the scanner. That is, the first and second one dimensional shadings (b) and (c) are corrected.

In the above embodiment, the low pass filter is formed of the digital filter. However, the low pass filter can be formed of a filter which processes an analog signal. In this case, the low pass filter is provided between the CCD sensor 1 and the analog-digital converter 2, and the low pass filter is activated at when the data in the RAM 6. In addition, calculators including multipliers can be substituted for the ROM 5 and the ROM 8 which are used for correcting the shadings.

The present invention is not limited to the aforementioned embodiments, and variations and modifications may be made without departing from the scope of the claimed invention.

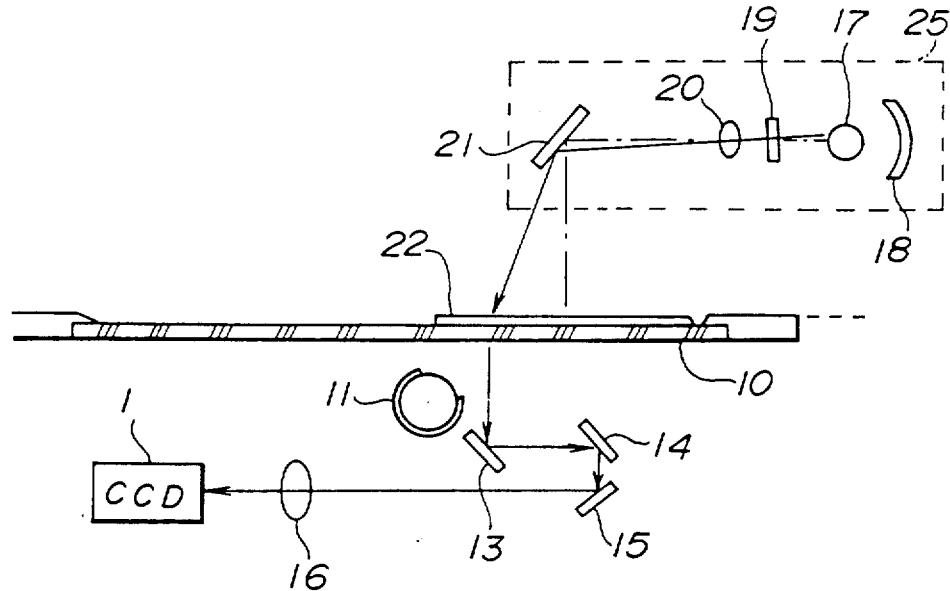

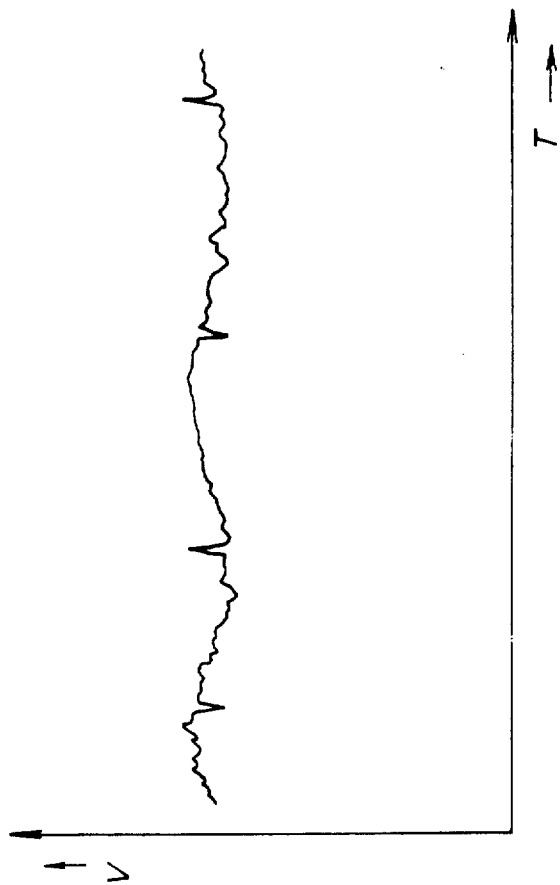

What is claimed is:

1. An image reading apparatus for reading an optical image which is projected onto a predetermined plane by a slide projector, said image reading apparatus comprising:

a) scanning means for optically scanning the optical image projected onto the plane and for generating image information corresponding to the optical image projected by the slide projector;
    b) first reference data storage means, coupled to said scanning means, for storing first reference data used for correcting a two dimensional shading which is generated in the image information based on an optical system of said slide projector, said first reference data storage means comprising:
        1) filter means, coupled to said scanning means, for eliminating a high frequency component of the image information and for outputting a low frequency component of the image information; and
        2) storage means, coupled to said filter means, for sampling the low frequency component of the image information corresponding to each a predetermined number of pixels when a predetermined reference optical image is projected onto the plane by the slide projector, and for storing the sampled low frequency component of the image information as the first reference data; and
    c) first correcting means, coupled to said scanning means and said first reference data storage means, for correcting the two dimensional shading including the image information supplied from said scanning means for every pixel based on the first reference data stored in said storage means so that the low frequency component is deleted from the image information.

2. An image reading apparatus as claimed in claim 1, wherein said filter means comprises a low pass filter through which a component having a frequency less than a predetermined value can pass.

3. An image reading apparatus as claimed in claim 1, wherein said filter means comprises a digital filter, digital data corresponding to the image information from said scanning means being supplied to said digital filter.

4. An image reading apparatus as claimed in claim 1, wherein said first correcting means comprises a memory to which the first reference data stored in said storage means and the image information generated by said scanning means are supplied as an address, said memory outputting corrected image information that the two dimensional shading has been corrected based on the first reference data.

5. An image reading apparatus as claimed in claim 1, further comprising:

d) second reference data storage means, coupled to said first correcting means, for sampling corrected image information output from said first correcting means for every pixel in a line when a white reference plate having a predetermined density is scanned by said scanning means, and for storing the sampled image information as second reference data; and
    e) second correcting means, coupled to said second reference data storage means, for correcting a shading included in said corrected information supplied from said first correcting means for every pixel based on the second reference data stored in said second reference data storage means.

6. An image reading apparatus as claimed in claim 5, wherein said second correcting means comprises a memory to which the second reference data stored in said second reference data storage means and the corrected image information output from said first correcting means are supplied as an address, said memory outputting corrected image information that the shading has been corrected based on the second reference data.

* * * * *

UNITED STATES PATENT AND TRADEMARK OFFICE
CERTIFICATE OF CORRECTION

PATENT NO. : 5,103,320                        Page 1 of 7

DATED : April 7, 1992

INVENTOR(S) : Ito

It is certified that error appears in the above-identified patent and that said Letters Patent is hereby corrected as shown below:

The title page should be deleted to appear as per attached title page.

Drawing sheets 1-5 should be deleted to be replaced with drawing sheets 1-5 consisting of Figs. 1-6, as shown on the attached pages.

Signed and Sealed this

Thirteenth Day of October, 1992

*Attest:*

DOUGLAS B. COMER

*Attesting Officer*            *Acting Commissioner of Patents and Trademarks*

United States Patent [19]

Ito

[11] Patent Number: 5,103,320
[45] Date of Patent: Apr. 7, 1992

[54] IMAGE READING APPARATUS WITH CORRECTION OF TWO-DIMENSIONAL SHADING

[75] Inventor: Masaaki Ito, Yokohama, Japan
[73] Assignee: Ricoh Company, Ltd., Tokyo, Japan
[21] Appl. No.: 713,282
[22] Filed: Jun. 11, 1991
[30] Foreign Application Priority Data
Jun. 11, 1990 [JP] Japan .................................. 2-149806
[51] Int. Cl.⁵ .............................................. H04N 1/00
[52] U.S. Cl. .................................. 358/461; 355/228; 355/233; 355/327; 358/474; 358/487
[58] Field of Search ............. 355/210, 233, 228, 229, 355/230, 232, 203, 204, 202, 200, 214, 326, 327; 358/405, 406, 461, 474, 487, 300, 905

[56] References Cited

U.S. PATENT DOCUMENTS

| | | | |
|---|---|---|---|
| 4,027,962 | 6/1977 | Mailloux | 355/327 X |
| 4,043,656 | 8/1977 | Cherian | 355/327 X |
| 4,063,810 | 12/1977 | Mailloux | 355/327 |
| 4,111,540 | 9/1978 | Bollman | 355/232 X |
| 4,120,580 | 10/1978 | Mailloux et al. | 355/327 |
| 4,216,495 | 8/1980 | Neilson et al. | 358/474 X |
| 4,520,395 | 5/1985 | Abe | 358/461 X |
| 4,760,464 | 7/1988 | Sakano | 358/461 |
| 4,831,458 | 5/1989 | Watanabe | 358/474 X |

Primary Examiner—A. T. Grimley
Assistant Examiner—Sandra L. Brasé
Attorney, Agent, or Firm—Oblon, Spivak, McClelland, Maier & Neustadt

[57] ABSTRACT

An image reading apparatus reads an optical image which is projected onto a predetermined plane by a slide projector. The image reading apparatus includes a scanner for optically scanning the optical image formed by the slide projector and for generating image information, a filter for eliminating a high frequency component of the image information and for outputting a low frequency component of the image information, a memory for sampling the low frequency component of the image information corresponding to each predetermined number of pixels when a predetermined reference optical image is formed by the slide projector, and for storing the sampled low frequency component of the image information as reference data, and a correcting circuit for correcting the two dimensional shading including the image information supplied from the scanner means for every pixel based on the reference data stored in the memory so that the low frequency component is deleted from the image information.

6 Claims, 5 Drawing Sheets